US012737069B2

(12) United States Patent
Kim et al.

(10) Patent No.: US 12,737,069 B2
(45) Date of Patent: Sep. 15, 2026

(54) STYLUS PEN

(71) Applicant: HiDeep, Inc., Seongnam-si (KR)

(72) Inventors: Seyeob Kim, Seongnam-si (KR); Hojun Moon, Seongnam-si (KR)

(73) Assignee: HIDEEP, INC., Seongnam-si (KR)

( * ) Notice: Subject to any disclaimer, the term of this patent is extended or adjusted under 35 U.S.C. 154(b) by 0 days.

(21) Appl. No.: 18/862,261

(22) PCT Filed: Apr. 7, 2023

(86) PCT No.: PCT/KR2023/004751

§ 371 (c)(1), (2) Date: Nov. 1, 2024

(87) PCT Pub. No.: WO2023/219280

PCT Pub. Date: Nov. 16, 2023

(65) Prior Publication Data

US 2025/0291438 A1 Sep. 18, 2025

(30) Foreign Application Priority Data

May 12, 2022 (KR) ........................ 10-2022-0058503

(51) Int. Cl.

*G06F 3/041* (2006.01)
*G06F 3/0354* (2013.01)

(Continued)

(52) U.S. Cl.

CPC ........ *G06F 3/04162* (2019.05); *G06F 3/0354* (2013.01); *G06F 3/03545* (2013.01);

(Continued)

(58) Field of Classification Search

CPC ............. G06F 3/04162; G06F 3/03545; G06F 3/0383; G06F 3/046; G06F 3/0441;

(Continued)

(56) References Cited

U.S. PATENT DOCUMENTS 9,778,761 B2 10/2017 Katsurahira
11,481,047 B2 10/2022 Jung et al.

(Continued)

FOREIGN PATENT DOCUMENTS

JP H05-241715 9/1993
KR 10-2171801 10/2020

(Continued)

OTHER PUBLICATIONS

Machine translation of JP 05-241715 (Year: 1993).*
KIPO. PCT Search Report & Written Opinion of PCT/KR2023/004751, dated Jul. 3, 2023. total 8 pages.

*Primary Examiner* — Patrick N Edouard
*Assistant Examiner* — Joseph P Fox
(74) *Attorney, Agent, or Firm* — LEX IP MEISTER, PLLC

(57) ABSTRACT

The present disclosure relates to a stylus pen. The stylus pen according to the present disclosure includes: a housing; a resonance circuit unit accommodated in an internal space of the housing, including an inductor unit and a capacitor unit electrically connected to the inductor unit, and configured to resonate in response to a magnetic signal generated by a touch screen; and a magnetic field blocking unit surrounding at least a partial portion of the resonance circuit unit, and including a magnetic material.

15 Claims, 17 Drawing Sheets

(51) Int. Cl.
*G06F 3/038* (2013.01)
*G06F 3/046* (2006.01)
*G06F 3/044* (2006.01)

(52) U.S. Cl.
CPC ............ *G06F 3/0383* (2013.01); *G06F 3/041* (2013.01); *G06F 3/0412* (2013.01); *G06F 3/046* (2013.01); *G06F 3/0441* (2019.05); *G06F 2203/04108* (2013.01)

(58) Field of Classification Search
CPC ......... G06F 2203/04108; G06F 3/0354; G06F 3/041; G06F 3/0412
See application file for complete search history.

(56) References Cited

U.S. PATENT DOCUMENTS

2005/0162411 A1* 7/2005 Berkel van ......... G06F 3/03545 345/179
2013/0016073 A1* 1/2013 Lee ......................... H01F 1/401 345/179
2015/0130772 A1 5/2015 Katsurahira
2018/0101272 A1 4/2018 Xi et al.
2020/0310564 A1* 10/2020 Woo .................... G06F 3/03545
2021/0132711 A1 5/2021 Jung et al.

FOREIGN PATENT DOCUMENTS

KR 10-2262510 6/2021
WO 2021-150045 7/2021

* cited by examiner

STYLUS PEN

TECHNICAL FIELD

The present disclosure relates to a stylus pen.

BACKGROUND ART

Various terminals, such as mobile phones, smart phones, tablet PCs, laptop computers, digital broadcasting terminals, personal digital assistants (PDAs), portable multimedia players (PMPs), and navigation devices, are equipped with touch sensors.

In such a terminal, the touch sensor may be positioned on a display panel that displays an image, or may be positioned in a region of a terminal body. When a user interacts with the terminal by touching the touch sensor, the terminal may provide an intuitive user interface to the user.

The user may use a stylus pen for inputting a precise touch. Such a stylus pen may transmit and receive signals to and from the touch sensor in an electrical and/or magnetic manner.

For example, when the touch sensor transmits a first electromagnetic signal, a resonance circuit included in the stylus pen resonates in response to the first electromagnetic signal. Then, the touch sensor may receive a second electromagnetic signal generated by the resonance of the resonant circuit from the stylus pen. Specifically, the resonance of the stylus pen may cause an eddy current in the touch sensor, and the touch sensor may determine a touch point of the stylus pen by analyzing the orientation and magnitude of the eddy current.

Meanwhile, the user may perform an approaching motion for approaching the stylus pen to the touch sensor in a hover state where the stylus pen and the touch sensor are spaced apart from each other by a predetermined distance, or a tilting motion for tilting the stylus pen at a predetermined angle on the touch sensor. In this case, the resonance frequency or the intensity of the second electromagnetic signal transmitted by the stylus pen may change due to the influence of the first electromagnetic signal transmitted by the touch sensor. Then, the touch sensor may not be able to precisely determine the touch point. Eventually, the touch sensitivity may decrease, making the user feel uncomfortable when using the stylus pen.

The aforementioned problems may lower the competitiveness of the stylus pen, leading to a decrease in sales volume.

DISCLOSURE

Technical Problem

The present disclosure attempts to provide a stylus pen capable of resonating in response to a first electromagnetic signal generated by a touch screen and transmitting a second electromagnetic signal to the touch screen.

The present disclosure attempts to provide a stylus pen capable of transmitting a second electromagnetic signal of which the intensity is kept constant to a touch screen.

The present disclosure attempts to provide a stylus pen capable of transmitting a second electromagnetic signal of which the resonance frequency is kept constant to a touch screen.

Technical Solution

An exemplary embodiment of the present disclosure provides a stylus pen including: a housing; a resonance circuit unit accommodated in an internal space of the housing, including an inductor unit and a capacitor unit electrically connected to the inductor unit, and configured to resonate in response to a magnetic signal generated by a touch screen; and a magnetic field blocking unit surrounding at least a partial portion of the resonance circuit unit, and including a magnetic material.

The stylus pen may further include a tip at least partially exposed to the outside of the housing, and the housing may include: a first region surrounding the inductor unit; a second region surrounding the tip and at least a partial portion of the inductor unit; and a third region surrounding the capacitor unit.

The magnetic field blocking unit may further include a first blocking portion where the magnetic material is coated on at least one of an inner surface and an outer surface of the first region.

The magnetic field blocking unit may further include a second blocking portion where the magnetic material is coated on at least one of an inner surface and an outer surface of the second region.

The magnetic field blocking unit may further include a third blocking portion where the magnetic material is coated on at least one of an inner surface and an outer surface of the third region.

The magnetic field blocking unit may further include a fourth blocking portion where the magnetic material is embedded between an inner surface and an outer surface of the first region.

The magnetic field blocking unit may further include a fifth blocking portion where the magnetic material is embedded between an inner surface and an outer surface of the second region.

The magnetic field blocking unit may further include a sixth blocking portion where the magnetic material is embedded between an inner surface and an outer surface of the third region.

The magnetic field blocking unit may further include a seventh blocking portion where the magnetic material is printed on at least one of an inner surface and an outer surface of the first region.

The magnetic field blocking unit may further include an eighth blocking portion where the magnetic material is printed on at least one of an inner surface and an outer surface of the second region.

The magnetic field blocking unit may further include a ninth blocking portion where the magnetic material is printed on at least one of an inner surface and an outer surface of the third region.

The magnetic field blocking unit may further include a tenth blocking portion where the magnetic material is applied on at least one of an inner surface and an outer surface of the first region.

The magnetic field blocking unit may further include an eleventh blocking portion where the magnetic material is applied on at least one of an inner surface and an outer surface of the second region.

The magnetic field blocking unit may further include a twelfth blocking portion where the magnetic material is applied on at least one of an inner surface and an outer surface of the third region.

The magnetic field blocking unit may further include a thirteenth blocking portion including a ferrite sheet attached onto at least one of an inner surface and an outer surface of the first region.

The magnetic field blocking unit may further include a fourteenth blocking portion including a ferrite sheet attached onto at least one of an inner surface and an outer surface of the second region.

The magnetic field blocking unit may further include a fifteenth blocking portion including a ferrite sheet attached onto at least one of an inner surface and an outer surface of the third region.

Advantageous Effects

The present disclosure is capable of estimating a touch point of the stylus pen with high accuracy because the magnetic field blocking unit provided in the stylus pen blocks an external electromagnetic field.

The present disclosure is capable of reducing an influence of an approaching motion or a tilting motion, so that an intensity of a second electromagnetic signal from the stylus pen is kept constant, thereby enabling an accurate touch.

The additional range of applicability of the present disclosure will become apparent from the following detailed description. However, since various changes and modifications made within the scope of the present disclosure may be clearly understood by those skilled in the art, it is to be understood that the detailed description and specific exemplary embodiments such as preferred exemplary embodiments of the present disclosure are provided only by way of example.

DESCRIPTION OF THE DRAWINGS

FIG. 4 is a diagram illustrating an example of a partial stack structure of a touch screen of FIG. 3.

MODE FOR INVENTION

Figure 1:
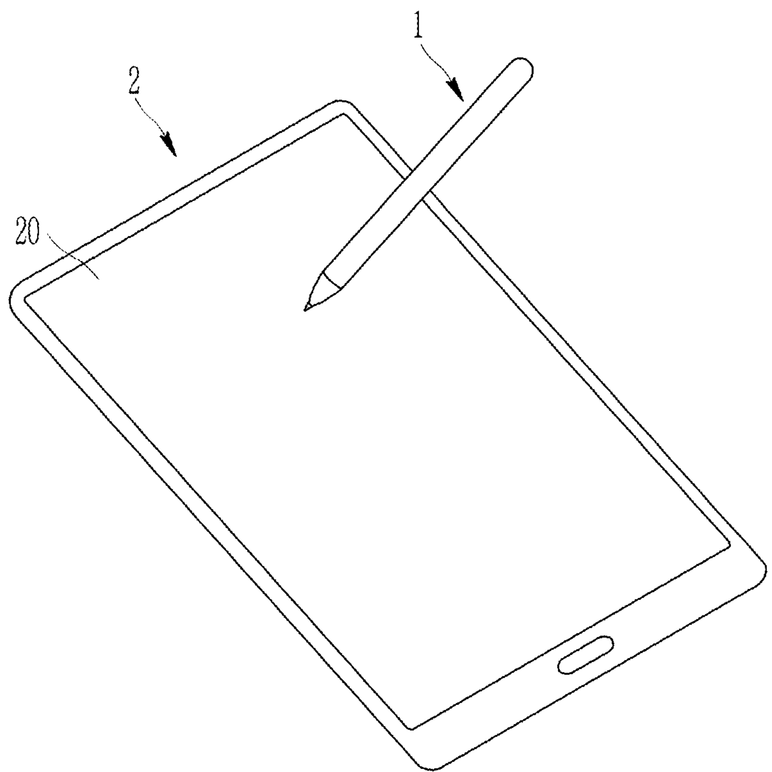
FIG. 1 is a conceptual diagram illustrating a stylus pen and an electronic device.

Hereinafter, various exemplary embodiments of the present disclosure will be described with reference to the accompanying drawings. However, it should be understood that this is not intended to limit the technology described herein to specific exemplary embodiments, but covers various modifications, equivalents, and/or alternatives of the exemplary embodiments of the present disclosure. In connection with the description of the drawings, similar reference numerals may be used for similar components.

In addition, the size and thickness of each component shown in the drawings are arbitrary for convenience of explanation, and the present disclosure is not necessarily limited to what is illustrated. In the drawings, thicknesses of several layers and regions are enlarged for clarity. In addition, in the drawings, for convenience of explanation, thicknesses of some layers and regions are exaggerated.

In addition, when a part such as a layer, a film, a region, or a plate is referred to as being "on" another part, it may be "directly on" another part or there may be an intervening part therebetween. In contrast, when a part is referred to as being "directly on" another part, there is no intervening part therebetween. In addition, when a part is referred to as being "on" a reference part, it is located on or under the reference part, and does not necessarily mean that it is located "on" the reference part in the opposite direction of gravity.

The expression "have", "may have", "include", "may include", or the like used herein indicates the presence of stated features (e.g., numerical values, functions, operations, or components such as parts) and does not preclude the presence of additional features.

The expression "A or B", "at least one of A and/or B", "one or more of A and/or B", or the like used herein may include all possible combinations of items enumerated therewith. For example, "A or B", "at least one of A and B", or "at least one of A or B" may mean (1) including at least one A, (2) including at least one B, or (3) including both at least one A and at least one B.

The expressions "first", "second", and the like used herein may modify various components regardless of order and/or importance, and may be used to distinguish one component from another component, and do not limit the components. For example, a first user device and a second user device may represent different user devices, regardless of order or importance. For example, without departing from the scope of the right set forth herein, a first component may be referred to as a second component, and similarly, the second component may be referred to as the first component.

It should further be understood that when a component (e.g., a first component) is referred to as being "(operatively or communicatively) coupled with/to" or "connected to" another component (e.g., a second component), this means that the components are coupled with/to each other directly or via an intervening component (e.g., a third component). On the other hand, it should be understood that when a component (e.g., a first component) is referred to as being "directly coupled with/to" or "directly connected to" another component (e.g., a second component), this means that there is no intervening component (e.g., a third component) between the components.

The expression "configured to (or set to)" used herein may be interchangeable with the expression "suitable for", "having the capacity to", "designed to", "adapted to", "made to", or "capable of" according to a situation. The term "configured to (set to)" does not necessarily mean "specifically designed to" in hardware. Instead, the expression "a device configured to . . . " may mean that the device is "capable of . . . " along with other devices or parts in a certain situation. For example, the phrase "a processor configured to (set to) perform A, B, and C" may mean a dedicated processor (e.g., an embedded processor) for performing the corresponding operations, or a generic-purpose processor (e.g., a CPU or an application processor) capable of performing the corresponding operations by executing one or more software programs stored in a memory device.

Terms used herein are used only to describe specific exemplary embodiments, and may not be intended to limit the scope of other exemplary embodiments. Singular expressions may include plural expressions unless the context clearly indicates otherwise. Terms used herein, including technical or scientific terms, may have the same meanings as those generally understood by those having ordinary knowledge in the art to which the present disclosure pertains. Among the terms used herein, terms defined in general dictionaries may be interpreted as having the same or similar meanings as those in the context of the related art, and shall not be interpreted as having ideal or excessively formal meanings unless clearly defined herein. In some cases, even the terms defined herein cannot be interpreted as excluding the exemplary embodiments of the present disclosure.

An electronic device according to various example embodiments of the present disclosure may include at least one of a smartphone, a tablet personal computer (PC), a mobile phone, a video telephone, an e-book reader, a laptop PC, a netbook computer, a mobile medical device, a camera, or a wearable device. According to various example embodiments, the wearable device may include at least one of an accessory-type device (e.g., a watch, a ring, a bracelet, an anklet, a necklace, glasses, a contact lens, or a head-mounted device (HMD)), a textile- or clothing-integrated device (e.g., an electronic garment), a body-attached device (e.g., a skin pad or a tattoo), or a bio-implantable device (e.g., an implantable circuit)

Hereinafter, a stylus pen according to exemplary embodiments will be described with reference to necessary drawings.

FIG. 1 is a conceptual diagram illustrating a stylus pen and an electronic device.

Referring to FIG. 1, a stylus pen 1 may receive a first electromagnetic signal generated by an electronic device 2 and transmit a second electromagnetic signal to a touch screen 20.

The stylus pen 1 may be classified into an active stylus pen or a passive stylus pen depending on whether a battery and an electronic component are provided therein. For example, in a case where the stylus pen 1 is a passive stylus pen of electro-magnetic resonance (EMR) type, a digitizer on the touch screen 20 may transmit an electromagnetic signal to the pen, and then receive a resonance signal from the pen to detect a touch position of the stylus pen.

According to an exemplary embodiment, the stylus pen 1 may be a pen using an EMR method, but is not limited thereto, and may include various types of stylus pens each resonating by a first electromagnetic signal generated by the touch screen 20 and transmitting a second electromagnetic signal to the touch screen 20.

The electronic device 2 may include at least one of a portable communication device (e.g., a smartphone or a tablet PC), a computer device, a portable multimedia device, a portable medical device, a wearable device, or a home appliance device. In addition, the electronic device 2 may be a flexible device or a flexible display device.

The electronic device 2 includes a touch screen 20. The touch screen 20 may generate a first electromagnetic signal for driving the stylus pen 1, and detect a second electromagnetic signal generated by the stylus pen 1. The touch screen 20 may detect a touch position of the stylus pen 1 based on the second electromagnetic signal.

Figure 2:
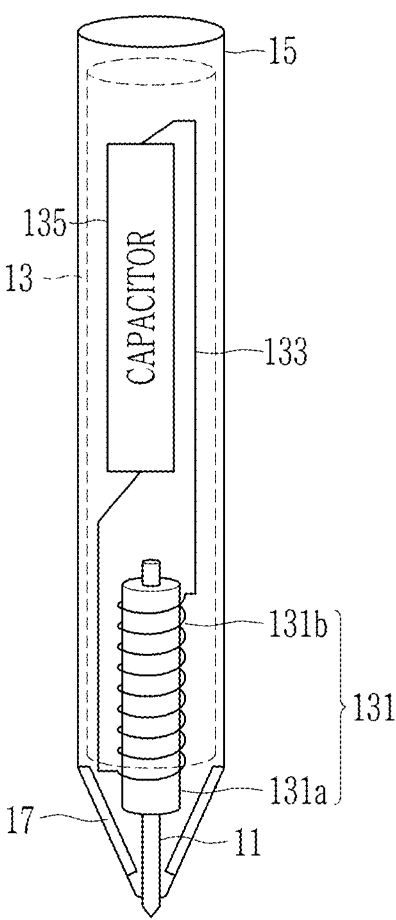
FIG. 2 is a diagram for explaining a configuration of the stylus pen of FIG. 1.

FIG. 2 is a diagram for explaining a configuration of the stylus pen of FIG. 1.

Referring to FIG. 2, the stylus pen 1 includes a tip 11, a resonance circuit unit 13, a housing 15, and a magnetic field blocking unit 17.

The tip 11 may be configured in such a manner that a partial portion thereof is exposed to the outside through an opening provided in the housing 15, but is not limited thereto. For example, a user may recognize a position indicated by the tip 11 as a touch position of the stylus pen 1. That is, the tip 11 may provide a visual effect for the touch position of the stylus pen 1 to the user.

The resonance circuit unit 13 includes an inductor unit 131, a connection unit 133, and a capacitor unit 135.

The resonance circuit unit 13 may resonate in response to a first electromagnetic signal of the touch screen 20. Specifically, the resonance circuit unit 13 may be an LC resonance circuit including an inductor unit 131 and a capacitor unit 135. The inductor unit 131 and the capacitor unit 135 may be connected to each other by the connection unit 133 to resonate in response to the first electromagnetic signal.

The first electromagnetic signal may include a signal (e.g., a sine wave, a square wave, or the like) having a frequency corresponding to the resonance frequency of the resonance circuit unit 13. The resonant frequency depends on the design value of the resonance circuit unit 13. For resonance, it is required that the resonant frequency of the resonance circuit unit 13 and the frequency of the first electromagnetic signal of the touch screen 20 be equal or very similar. The second electromagnetic signal is generated by the resonance of the resonance circuit unit 13.

The inductor unit 131 includes a core **131*a* and a coil 131*b*. For example, the core 131*a* may include a ferrite core. In FIG. 2, the coil 131*b* may be formed to surround the core 131*a*. According to $L=\mu SN^2/I$, an inductance of the inductor unit 131 is proportional to a magnetic coefficient (μ), a cross-sectional area (S) of the coil 131*b*, and the square of the number (N) of turns, and inversely proportional to a length (I) of the coil 131*b*. Referring to FIG. 2, the inductor unit 131 may be positioned to be spaced away from the tip 11** by a predetermined distance.

The connection unit 133 is a conductive member, which may be a wiring, a wire, a pin, a rod, a bar, or the like, but is not limited thereto.

The capacitor unit 135 may include a plurality of capacitors connected to each other in series and/or in parallel. The capacitors may have different capacitances, and may be trimmed in the manufacturing process.

The housing 15 may accommodate elements of the stylus pen 1 in its internal empty space. The housing 15 may have a circular column shape, a polygonal column shape, a column shape with at least a partial portion thereof having a curved surface, an entasis shape, a frustum-of-pyramid shape, a circular truncated cone shape, or the like, but is not limited thereto.

For example, the housing 15 may accommodate the tip 11 and the resonance circuit unit 13 in its internal empty space. In addition, the housing 15 may accommodate a partial portion of the tip 11 in its internal empty space. Referring to FIG. 2, a partial portion of the tip 11 may be exposed to the outside through an opening provided in the housing 15, but the housing 15 is not limited thereto.

According to an exemplary embodiment, the housing 15 includes a magnetic field blocking unit 17 including a magnetic material on at least one of an inner surface and an outer surface thereof. The magnetic field blocking unit 17 will be described in detail with reference FIGS. 13 to 15 later.

Figure 3:
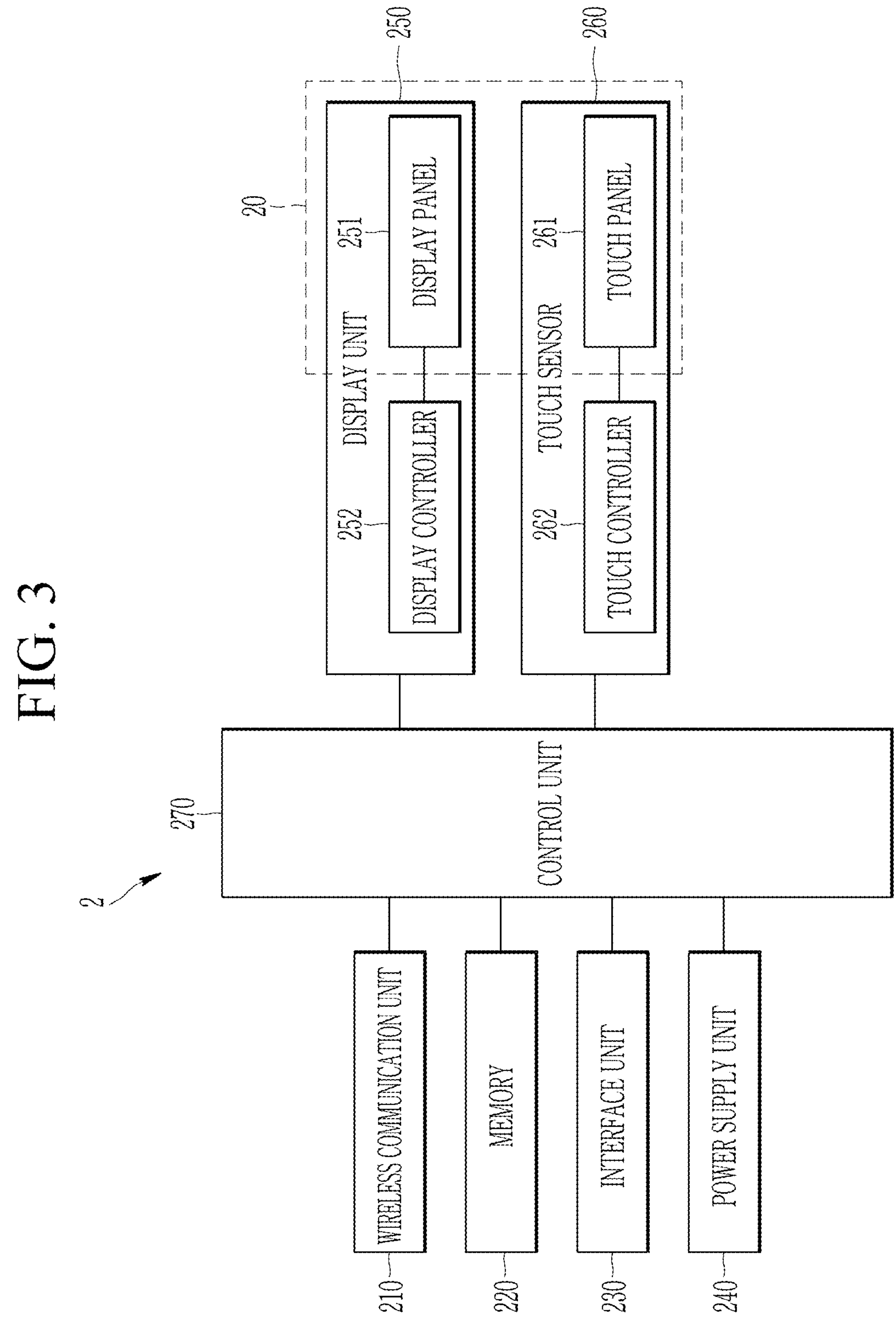
FIG. 3 is a block diagram for explaining a configuration of the electronic device of FIG. 1.

FIG. 3 is a block diagram for explaining a configuration of the electronic device of FIG. 1.

Referring to FIG. 3, the electronic device 2 may include a wireless communication unit 210, a memory 220, an interface unit 230, a power supply unit 240, a display unit 250, a touch sensor 260, a control unit 270, etc. The components illustrated in FIG. 3 are not essential for implementing the terminal, and the terminal described in the present disclosure may have more or fewer components than those listed above.

The wireless communication unit 210 may include one or more communication modules that enable wireless communication between the electronic device 2 and a wireless communication system, between the electronic device 2 and another electronic device 2, or between the electronic device 2 and an external server. In addition, the wireless communication unit 210 may include one or more communication modules that connect the electronic device 2 to one or more networks.

The memory 220 stores data supporting various functions of the electronic device 2. The memory 220 may store a plurality of application programs or applications running on the electronic device 2, data for the operations of the electronic device 2, and commands.

The interface unit 230 serves as a passage for connecting various types of external devices to the electronic device 2. For example, the interface unit 230 may include at least one of a wired/wireless headset port, an external charger port, a wired/wireless data port, a memory card port, a port for connecting a device having an identification module, an audio input/output (I/O) port, a video input/output (I/O) port, and an earphone port.

Under the control of the control unit 270, the power supply unit 240 receives external power and internal power, and supplies power to each of the components included in the electronic device 2. For example, the power supply unit 240 includes a battery. The battery may be a built-in battery or a replaceable battery.

The display unit 250 displays (outputs) information processed by the electronic device 2. For example, the display unit 250 may display execution screen information for an application program running on the electronic device 2, or user interface (UI) or graphic user interface (GUI) information according to the execution screen information.

The display unit 250 may include a liquid crystal display (LCD), an organic light-emitting diode (OLED) display, an e-ink display, and the like.

The display unit 250 includes a display panel 251 that displays an image, and a display controller 252 connected to the display panel 251 to supply signals for displaying an image to the display panel 251.

For example, the display panel 251 may include a plurality of pixels connected to signal lines such as a plurality of scan lines and a plurality of data lines, and a scan driver that supplies scan signals to the scan lines. The display controller 252 may include a data driving IC that generates data signals applied to the data lines, a timing controller that processes an image signal and controls the overall operations of the display unit 250, a power management IC, etc.

The touch sensor 260 detects a touch (or touch input) applied to a touch area using a capacitive method. As an example, the touch sensor 260 may be configured to convert a change in electrostatic capacitance, voltage, or current occurring at a specific location into an electrical input signal.

The touch sensor 260 may be configured to detect a position at which a touch object for applying a touch on a touch area touches the touch sensor 260, an area of the touch, a capacitance at the time of the touch, and the like. Here, the touch object is an object for applying a touch to the touch sensor 260, and may be, for example, a user's body part (a finger, a palm, or the like) or the stylus pen 1.

The touch sensor 260 includes a touch panel 261 and a touch controller 262. The touch panel 261 includes a touch electrode. The touch controller 262 applies a driving signal to the touch panel 261, and receives a sensing signal from the touch panel 261. In addition, the touch controller 262 transmits touch data to the control unit 270 and/or the display controller 252.

The touch controller 262 may include a driving unit, a reception unit, and a micro control unit (MCU). The driving unit is connected to a plurality of first touch electrodes and a plurality of second touch electrodes to apply a driving signal. The reception unit is connected to the plurality of first touch electrodes and the plurality of second touch electrodes to receive a sensing signal. The MCU controls the operations of the driving unit and the reception unit, and determines a touch position using the sensing signal output from the reception unit.

The display panel 251 and the touch panel 261 form a layered-structure together or are integrally formed, and may be referred to as the touch screen 20.

In addition to application program-related operations, the control unit 270 generally controls the overall operations of the electronic device 2. The control unit 270 may provide or process appropriate information or functions to the user by processing signals, data, information, etc. input or output through the components described above or by driving an application program stored in the memory 270.

The control unit 270 may control at least some of the components described with reference to FIG. 3 to drive the application program stored in the memory 220. Furthermore, the control unit 270 may operate two or more of the components included in the electronic device 2 in combination to drive the application program.

Figure 4:
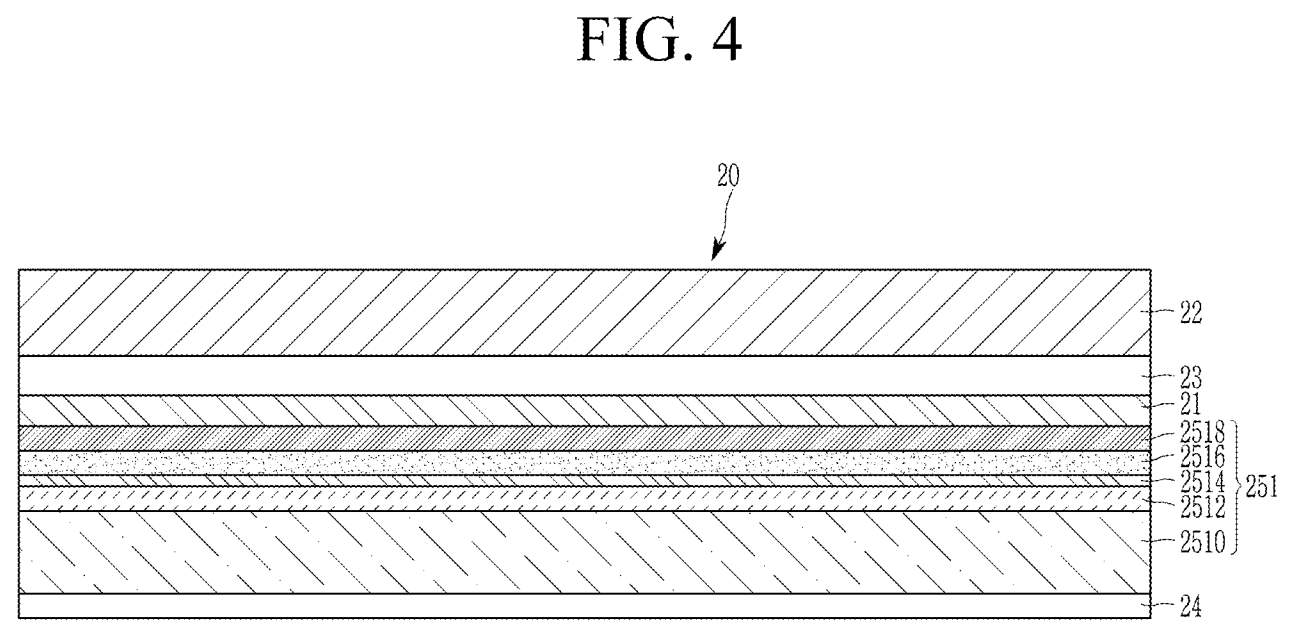

FIG. 4 is a diagram illustrating an example of a partial stack structure of the touch screen of FIG. 3.

Referring to FIG. 4, for example, the touch screen 20 may include a touch electrode layer 21, a protective layer 22, a polarizing layer 23, a magnetic field shielding layer 24, and a display panel 251.

The touch electrode layer 21 is a layer that recognizes a touch input, and may function as a touch member. For example, the touch electrode layer 21 may include a plurality of touch areas and a plurality of touch electrodes.

The protective layer 22 may be disposed on the polarizing layer 23. For example, the protective layer 22 may include a window member. The protective layer 22 may be attached onto the polarizing layer 23 by an optical transparent adhesive or the like.

The polarizing layer 23 may be disposed on the touch electrode layer 21. For example, the polarizing layer 23 may serve to reduce reflection of external light. The polarizing layer 23 may be attached onto the touch electrode layer 21 through an adhesive layer. The polarizing layer 23 may be omitted.

When the touch electrode layer 21 and/or the stylus pen 1 form a magnetic field, the magnetic field shielding layer 24 may block eddy currents that may be generated from other electrical elements and components. The magnetic field shielding layer 24 may be disposed under the display panel 251. For example, the magnetic field shielding layer 24 may include a ferrite sheet that blocks a magnetic field. As another example, the magnetic field shielding layer 24 may include ferrite powder bonded under a substrate 2510.

The display panel 251 may include a substrate 2510, a circuit driving layer 2512, a light emitting layer 2514, and a common electrode layer 2516.

The circuit driving layer 2512 may be disposed on the substrate 2510. The circuit driving layer 2512 may include a circuit that drives the light emitting layer 2514 of a pixel displaying an image. For example, the circuit driving layer 2512 may include a plurality of thin film transistors and a plurality of capacitors.

The light emitting layer 2514 may be disposed on the circuit driving layer 2512. The light emitting layer 2514 may include an organic light emitting layer. The light emitting layer 2514 may emit light at any of various brightnesses according to a driving signal transmitted from the circuit driving layer 2512.

The common electrode layer 2516 may be disposed on the light emitting layer 2514. The common electrode layer 2516 may have at least one opening in the form of a slit.

An encapsulation layer 2518 may be disposed on the common electrode layer 2516. The encapsulation layer 2518 may include an inorganic film or a film in which an inorganic film and an organic film are stacked. As another example, glass or an encapsulation film may be applied as the encapsulation layer 2518. The touch electrode layer 21, a touch electrode, or the like may be disposed on the encapsulation layer 2518.

Figure 5:
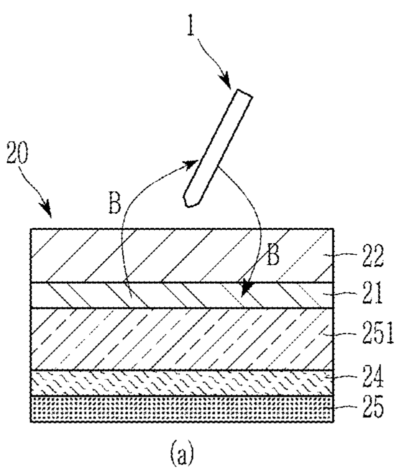
FIG. 5 is a diagram for explaining a method of transmitting and receiving signals between a stylus pen and a touch screen.
Figure 5:
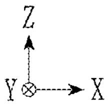

FIG. 5 is a diagram for explaining a method of transmitting and receiving signals between a stylus pen and a touch screen.

Referring to FIG. 5, the touch screen 20 may include a ground layer (GND) 25 in addition to the touch electrode layer 21, the protective layer 22, the display panel 251, and the magnetic field shielding layer 24, which are described above. However, FIG. 5 is an example for convenience of explanation, and the touch screen 20 may include a plurality of layers having various functions.

The touch electrode layer 21 may generate a first electromagnetic signal, transmit the first electromagnetic signal to the stylus pen 1, and receive a second electromagnetic signal from the stylus pen 1. Specifically, when the electrode of the touch electrode layer 21 generates a first electromagnetic signal, the stylus pen 1 resonates. Then, the touch electrode layer 21 may receive a second electromagnetic signal generated by the resonance of the stylus pen 1. For example, in a case where the electrode of the touch electrode layer 21 is formed of a metal mesh with a low resistance, the touch electrode layer 21 may receive a second electrophysical signal from the stylus pen 1.

FIGS. 6 to 11 are diagrams illustrating examples each for explaining a change in resonance frequency and inductance according to an approaching motion or a tilting motion.

Figure 6:
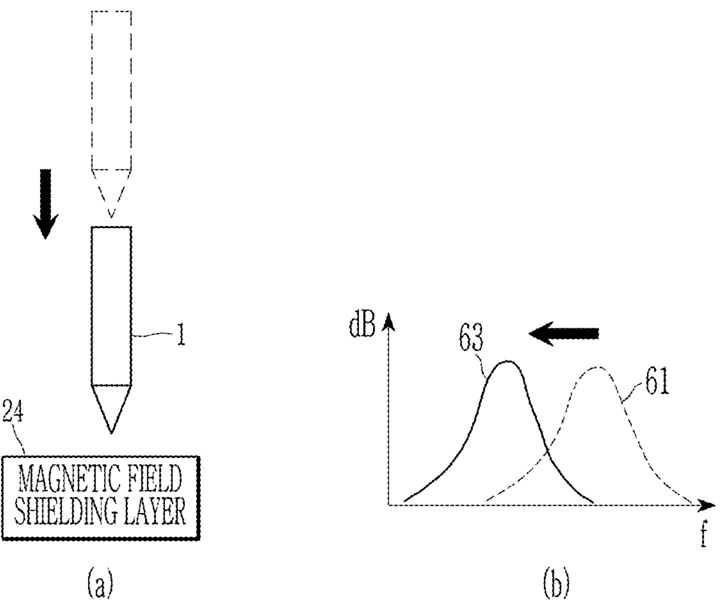
FIG. 6 is a diagram for explaining a change in resonance frequency according to an approaching motion of a stylus pen above a touch screen including a magnetic field shielding layer with strong magnetism.
Figure 7:
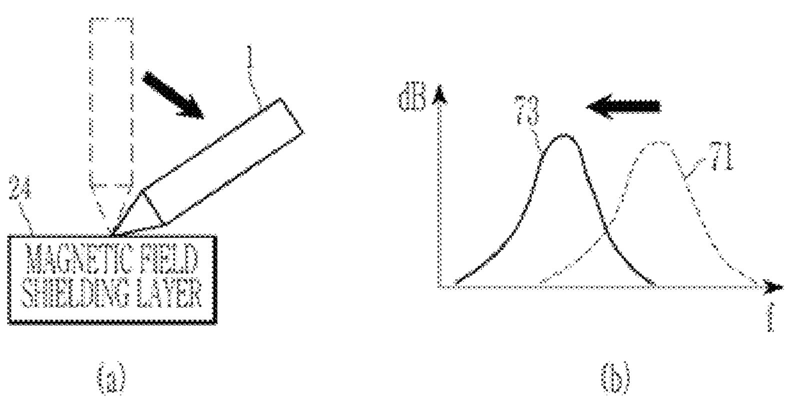
FIG. 7 is a diagram for explaining a change in resonance frequency according to a tilting motion of a stylus pen on s touch screen including a magnetic field shielding layer with strong magnetism.

FIG. 6 is a diagram for explaining a change in resonance frequency according to an approaching motion of a stylus pen above a touch screen with strong magnetism, and FIG. 7 is a diagram for explaining a change in resonance frequency according to a tilting motion of a stylus pen on a touch screen with strong magnetism.

Referring to FIGS. 6 and 7, the touch screen 20 may include a magnetic field shielding layer 24 having strong magnetism. The magnetic field shielding layer 24 may include a ferrite sheet.

In this case, when the user performs an approaching motion or a tilting motion, the inductance of the inductor unit 131 may change. In addition, when the inductance changes, the resonance frequency of the resonance circuit unit 13 including the inductor unit 131 may change. At this time, the approaching motion may be a user's motion for approaching the stylus pen 1 to the touch screen 20 in a hover state in which the stylus pen 1 and the touch screen 20 are spaced apart from each other by a predetermined distance. The tilting motion may be a user's motion for tilting the stylus pen 1 at a predetermined angle on the touch screen 20.

For example, when the user performs an approaching motion or a tilting motion, the resonance frequency of the resonance circuit unit 13 may decrease. Referring to FIG. 6, when the user performs an approaching motion as shown in FIG. 6A, a frequency 61 before the approaching motion may decrease to a frequency 63 after the approaching motion as shown in FIG. 6B. Also, referring to FIG. 7, when the user performs a tilting motion as shown in FIG. 7A, a frequency 71 before the tilting motion may decrease to a frequency 73 after the tilting motion as shown in FIG. 7B.

Then, the frequency of the first electromagnetic signal generated by the touch screen 20 and the resonance frequency of the resonance circuit unit 13 may change, and the resonance circuit unit 13 of the stylus pen 1 may not resonate, or a second electromagnetic signal of small intensity may be output even if the resonance circuit unit 13 of the stylus pen 1 resonates. That is, even if the stylus pen 1 receives a first electromagnetic signal, the stylus pen 1 may not be able to transmit a second electromagnetic signal of sufficient intensity to the touch screen 20.

Figure 8:
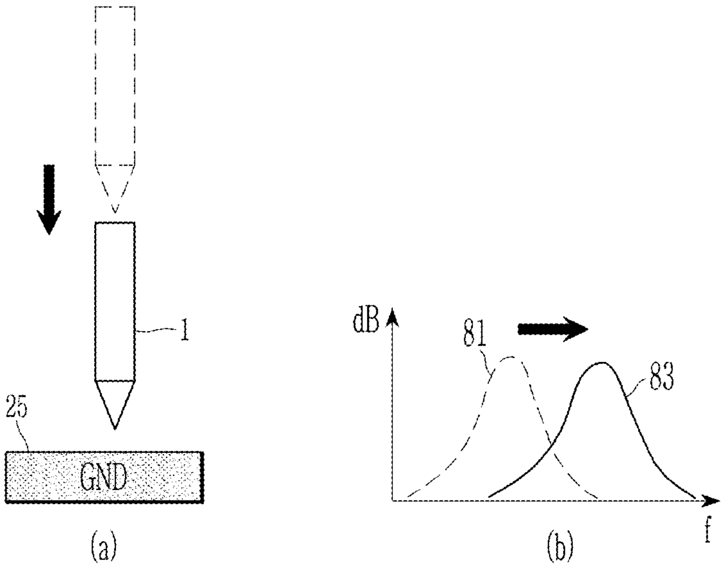
FIG. 8 is a diagram for explaining a change in resonance frequency according to an approaching motion of a stylus pen above a touch screen with strong ground.
Figure 9:
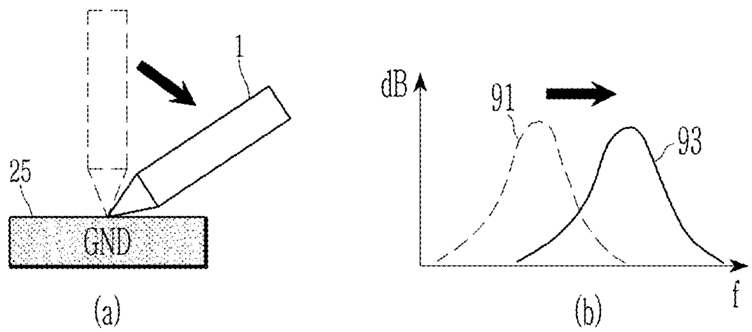
FIG. 9 is a diagram for explaining a change in resonance frequency according to a tilting motion of a stylus pen on a touch screen with strong ground.

FIG. 8 is a diagram for explaining a change in resonance frequency according to an approaching motion of a stylus pen above a touch screen with strong ground, and FIG. 9 is a diagram for explaining a change in resonance frequency according to a tilting motion of a stylus pen on a touch screen with strong ground.

Referring to FIGS. 8 and 9, the touch screen 20 may include a ground layer 25.

In this case, when the user performs an approaching motion or a tilting motion, the inductance of the inductor unit 131 and the magnitude of the second electromagnetic signal may change.

For example, when the user performs an approaching motion or a tilting motion, the resonance frequency of the resonance circuit unit 13 may increase. Referring to FIG. 8, when the user performs an approaching motion as shown in FIG. 8A, a frequency 81 before the approaching motion may increase to a frequency 83 after the approaching motion as shown in FIG. 8B. Also, referring to FIG. 9, when the user performs a tiling motion as shown in FIG. 9A, a frequency 91 before the tiling motion may increase to a frequency 93 after the tiling motion as shown in FIG. 9B.

Then, the frequency of the first electromagnetic signal generated by the touch screen 20 and the resonance frequency of the resonance circuit unit 13 may change, and the resonance circuit unit 13 of the stylus pen 1 may not resonate, or a second electromagnetic signal of small intensity may be output even if the resonance circuit unit 13 of the stylus pen 1 resonates. In addition, even if the stylus pen 1 that has received a first electromagnetic signal generates a second electromagnetic signal, the touch screen 20 may not be able to receive the second electromagnetic signal smoothly due to the interference of the ground layer 25. That is, the intensity of the second electromagnetic signal may decrease, and the touch screen 20 may not be able to detect the touch of the stylus pen 1.

Figure 10:
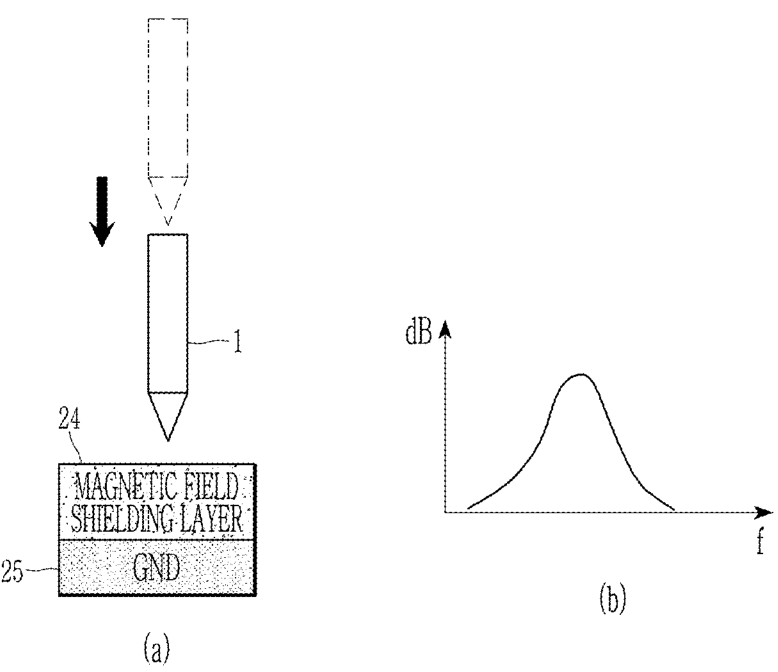
FIG. 10 is a diagram for explaining a change in resonance frequency according to an approaching motion of a stylus pen above a touch screen including a magnetic field shielding layer with strong magnetism and a ground layer with strong ground.
Figure 11:
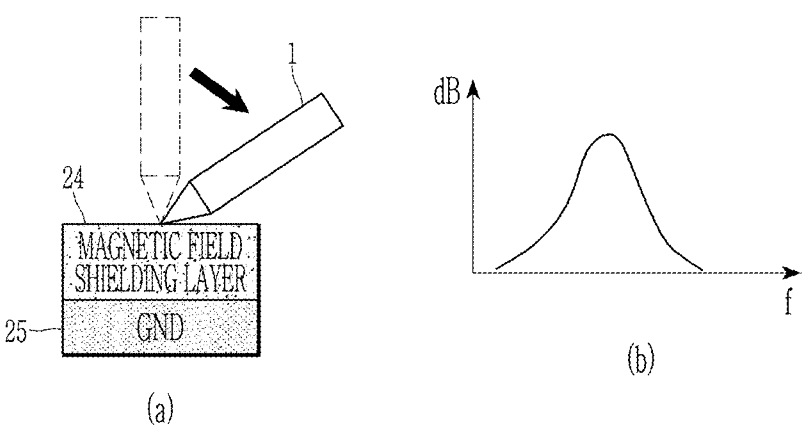
FIG. 11 is a diagram for explaining a change in resonance frequency according to a tilting motion of a stylus pen on a touch screen including a magnetic field shielding layer with strong magnetism and a ground layer with strong ground.

FIG. 10 is a diagram for explaining a change in resonance frequency according to an approaching motion of a stylus pen above a touch screen including a magnetic field shielding layer and a ground layer, and FIG. 11 is a diagram for explaining a change in resonance frequency according to a tilting motion of a stylus pen on a touch screen including a magnetic field shielding layer and a ground layer.

Referring to FIGS. 10 and 11, the touch screen 20 may include a magnetic field shielding layer 24 having strong magnetism and a ground layer 25.

In this case, when the user performs an approaching motion or a tilting motion, the inductance of the inductor unit 131 may be kept constant, but the intensity of the second electromagnetic signal may change.

Since the inductance of the inductor unit 131 does not change, the resonance frequency can be kept constant, as shown in FIG. 10B and FIG. 11B. However, even if the stylus pen 1 that has received a first electromagnetic signal generates a second electromagnetic signal, the touch screen 20 may not be able to receive the second electromagnetic signal smoothly due to the interference of the ground layer 25.

In FIGS. 6 to 11, it has been confirmed that when the user performs an approaching motion or a tilting motion, the inductance of the inductor unit 131 and/or the magnitude of the second electromagnetic signal may change. However, the magnetic field shielding layer 24 is an essential component of the touch screen 20, because it functions to block eddy currents that may be generated in other electrical elements and components when the touch electrode layer 21 and/or the stylus pen 1 form a magnetic field as described above. That is, if the magnetic field shielding layer 24 is removed from the touch screen 20, the aforementioned problem may be solved. However, the touch screen 20 may not include the above-described function exhibited by the magnetic field shielding layer 24.

Hereinafter, a structure capable of maintaining the magnitude of the second electromagnetic signal at a preset value while the inductance of the inductor unit 131 is constant even when the user performs an approaching motion or a tilting motion will be described.

Figure 12:
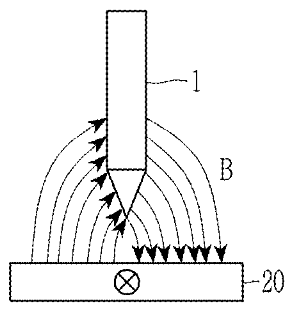
FIG. 12 is a conceptual diagram for explaining an influence of a magnetic field generated by a touch screen on a stylus pen.

FIG. 12 is a conceptual diagram for explaining an influence of a second magnetic field generated by a touch screen on a stylus pen.

Referring to FIG. 12, when the inductor unit 131 of the stylus pen 1 is affected by a magnetic field generated by the touch screen 20, the inductance of the inductor unit 131 may change. That is, FIG. 12 may be a diagram for explaining that the stylus pen 1 is affected by the magnetic field generated by the touch screen 20 as described above with reference to FIGS. 6 to 11.

According to an exemplary embodiment, in order to eliminate the influence of the magnetic field generated by the touch screen 20 on the stylus pen 1, the stylus pen 1 may further include a magnetic field blocking unit 17. Hereinafter, the magnetic field blocking unit 17 will be described in detail with reference to FIGS. 13 to 15.

Figure 13:
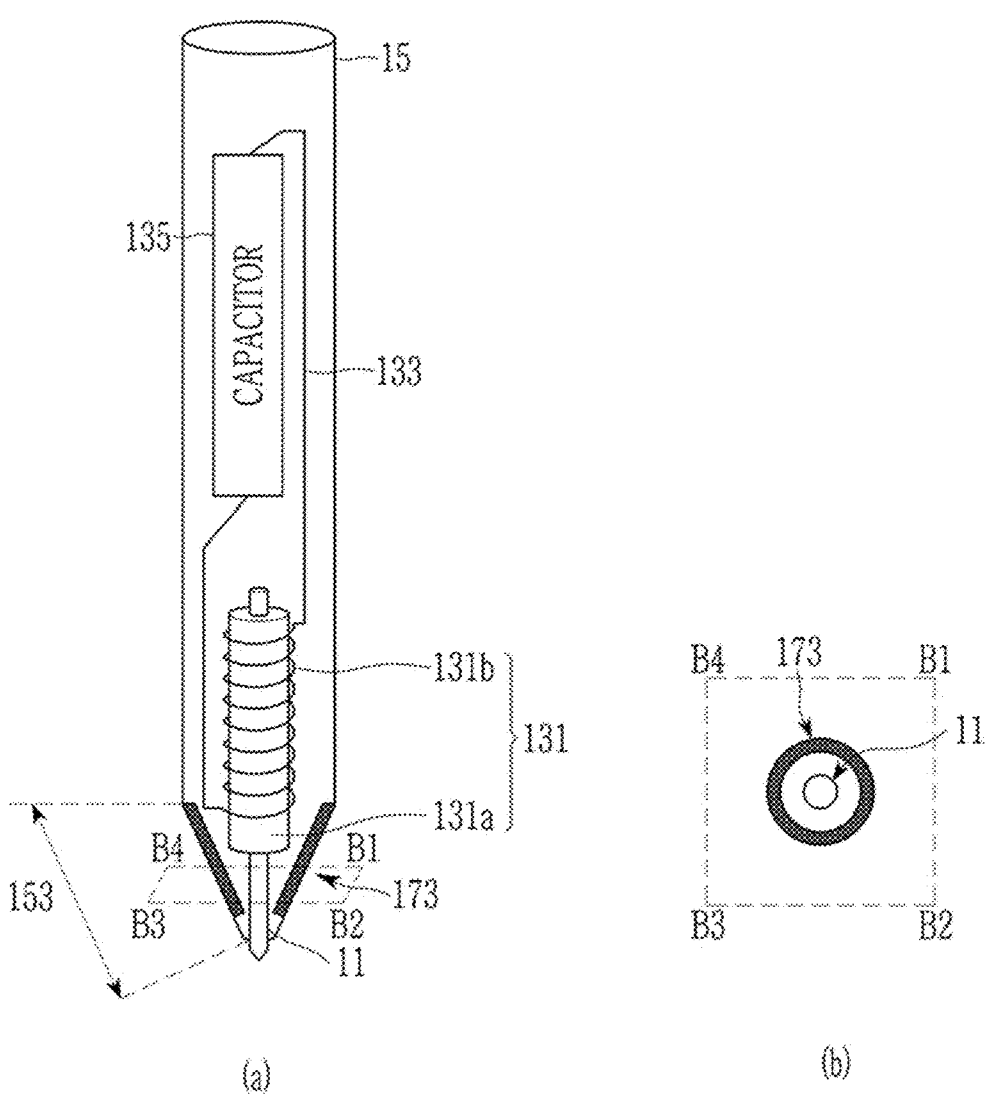
FIG. 13 is a diagram illustrating an example of a magnetic field blocking unit according to an exemplary embodiment.
Figure 14:
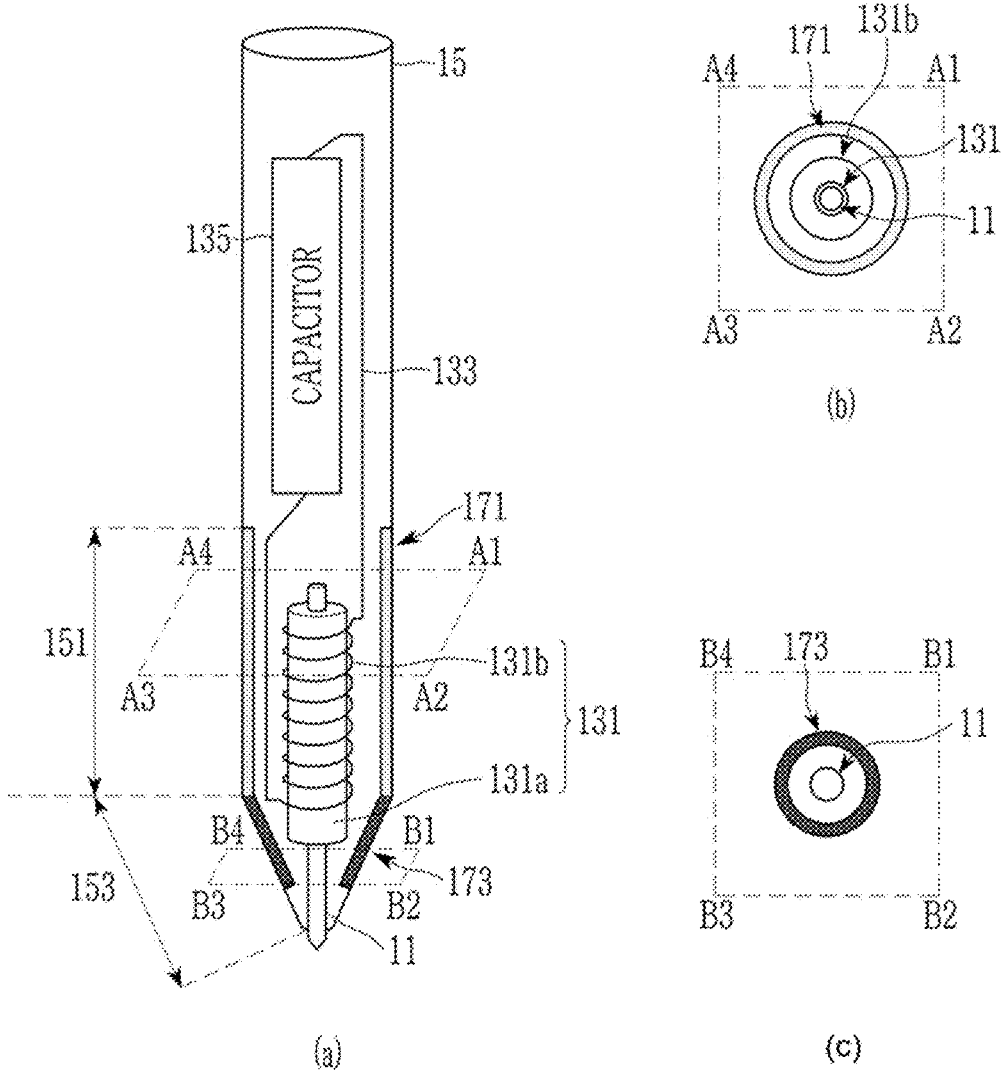
FIG. 14 is a diagram illustrating another example of a magnetic field blocking unit according to an exemplary embodiment.
Figure 15:
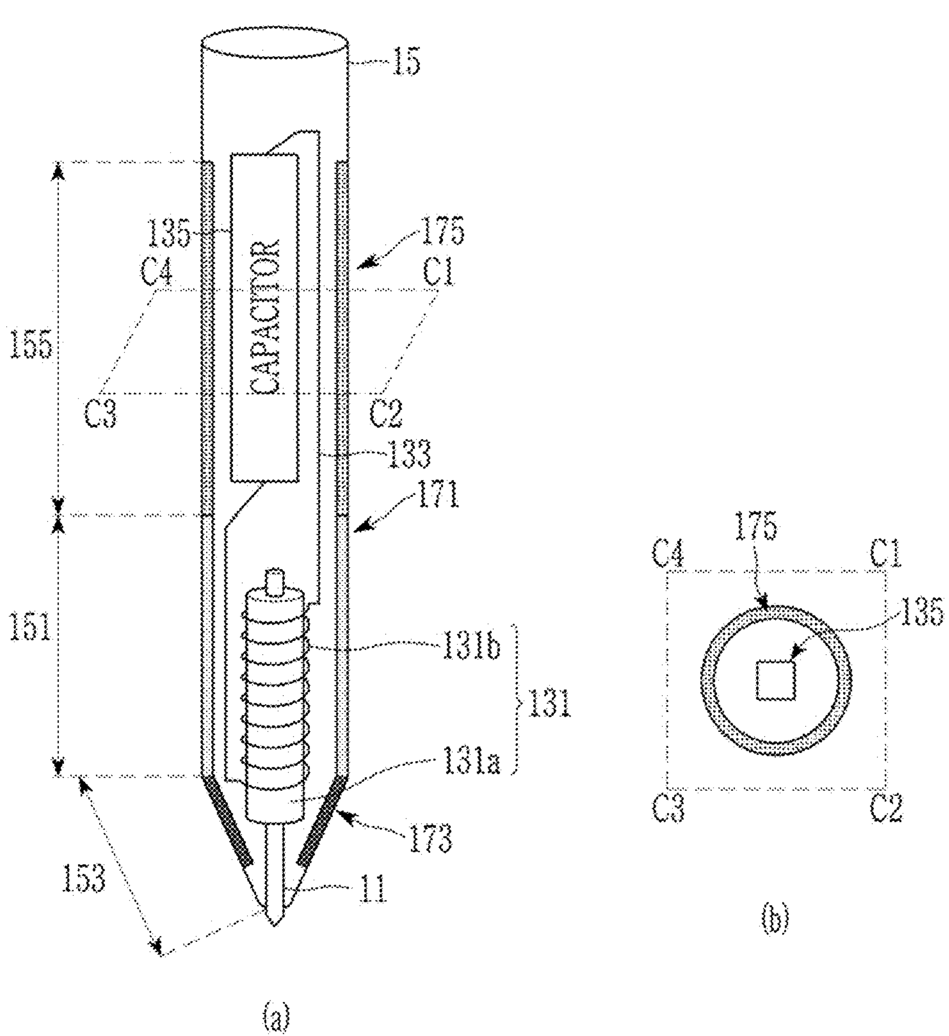
FIG. 15 is a diagram illustrating another example of a magnetic field blocking unit according to an exemplary embodiment.

FIG. 13 is a diagram illustrating an example of a magnetic field blocking unit according to an exemplary embodiment, FIG. 14 is a diagram illustrating another example of a magnetic field blocking unit according to an exemplary embodiment, and FIG. 15 is a diagram illustrating another example of a magnetic field blocking unit according to an exemplary embodiment.

Referring to FIGS. 13 to 15, the housing 15 may include a body portion adjacent to the resonance circuit unit 13 and a holder portion adjacent to the tip 11.

The body portion may accommodate a resonance circuit unit 13 (131, 133, 135) in its internal empty space. According to an exemplary embodiment, the body portion may correspond to a first region 151 and a third region 155 to be described below. For example, the body portion may have a circular column shape, a polygonal column shape, a column shape with at least a partial portion thereof having a curved surface, an entasis shape, a frustum-of-pyramid shape, a circular truncated cone shape, or the like, but is not limited thereto.

The holder portion may accommodate the tip 11 and a partial portion of the inductor unit 131 in its internal empty space. According to an exemplary embodiment, the holder portion may correspond to a second region 153 to be described below. For example, the holder portion may have a horn shape with an opening as illustrated in FIGS. 13 to 15. That is, a partial portion of the tip 11 may be exposed to the outside through the opening provided in the holder portion. In addition, the holder portion is not limited to the horn shape illustrated in FIGS. 13 to 15, and may have any of the various shapes such as a cylindrical shape and a pipe shape with an opening through which a partial portion of the tip 11 is exposed to the outside.

The housing 15 may be divided into a first region 151, a second region 153, and a third region 155. Referring to FIG. 15, the first region 151 may be the housing 15 corresponding to a position where the inductor unit 131 is accommodated. The second region 153 may be the housing 15 corresponding to a position where the tip 11 and a partial portion of the inductor unit 131 are accommodated. As described above, the second region 153 may have an opening through which a partial portion of the tip 11 is exposed to the outside. The third region 155 may be the housing 15 corresponding to a position where the capacitor unit 135 is accommodated.

The magnetic field blocking unit 17 may be formed in at least one of the first region 151, the second region 153, and the third region 155. For example, the magnetic field blocking unit 17 may be coupled to one region of the housing 15 by coating, embedding, printing, or applying a magnetic material. Hereinafter, it will be described that the magnetic field blocking unit 17 is attaching to at least one of the first region 151, the second region 153, and the third region 155 of the housing 15, but is not limited thereto.

The magnetic field blocking unit 17 may include a first blocking portion 171, a second blocking portion 173, and a third blocking portion 175.

Referring to FIG. 13, according to an exemplary embodiment, in order to reduce the influence of the magnetic field generated by the touch screen 20, the magnetic field blocking unit 17 may include a second blocking portion 173.

Referring to FIGS. 13(*a*) and 13(*b*), for example, the second blocking portion 173 may be formed to include a magnetic material on the entire surface of the second region 153. That is, the second blocking portion 173 may be formed in such a manner that the magnetic material surrounds the tip 11 and at least a partial portion of the inductor unit 131. As another example, referring to FIG. 13(*a*), the second blocking portion 173 may be positioned to be spaced apart from the opening by a predetermined distance in the second region 153, and formed such a manner that the magnetic material surrounds the tip 11 and at least a partial portion of the inductor unit 131.

The second blocking portion 173 may be formed on at least one of an inner surface and an outer surface of the second region 153. According to an exemplary embodiment, the second blocking portion 173 may be formed on at least one of the inner surface and the outer surface of the second region 153 by coating, printing, or applying the magnetic material. Alternatively, the second blocking portion 173 may be formed in such a manner that the magnetic material is embedded between the inner surface and the outer surface of the second region 153. Alternatively, the second blocking portion 173 may include a ferrite sheet attached onto at least one of the inner surface and the outer surface of the second region 153.

Referring to FIG. 14, according to another exemplary embodiment, the magnetic field blocking unit 17 may include a first blocking portion 171 and a second blocking portion 173.

Referring to FIG. 14(*a*) and FIG. 14(*b*), in order to shield the inductor unit 131 from the magnetic field generated by the touch screen 20, the first blocking portion 171 may be formed to include a magnetic material on the entire surface of the first region 151. That is, the first blocking portion 171 may be formed in such a manner that the magnetic material surrounds the inductor unit 131.

The first blocking portion 171 may be formed on at least one of an inner surface and an outer surface of the first region 151. According to an exemplary embodiment, the first blocking portion 171 may be formed on at least one of the inner surface and the outer surface of the first region 151 by coating, printing, or applying the magnetic material. Alternatively, the first blocking portion 171 may be formed in such a manner that the magnetic material is embedded between the inner surface and the outer surface of the first region 151. Alternatively, the first blocking portion 171 may include a ferrite sheet attached onto at least one of the inner surface and the outer surface of the first region 151.

Also, the second blocking portion 173 may be formed to include a magnetic material on at least one of an inner surface and an outer surface of the second region 153. Specifically, the second blocking portion 173 may have the configuration described with reference to FIG. 13.

Referring to FIG. 15, according to another exemplary embodiment, the magnetic field blocking unit 17 may include a first blocking portion 171, a second blocking portion 173, and a third blocking portion 175.

Referring to FIG. 15(*a*) and FIG. 15(*b*), in order to shield the capacitor unit 135 from the magnetic field generated by the touch screen 20, the third blocking portion 175 may be formed to include a magnetic material on the entire surface of the third region 155. That is, the third blocking portion 175 may be formed in such a manner that the magnetic material surrounds the capacitor unit 135.

The third blocking portion 175 may be formed on at least one of an inner surface and an outer surface of the third region 155. According to an exemplary embodiment, the third blocking portion 175 may be formed on at least one of the inner surface and the outer surface of the third region 155 by coating, printing, or applying the magnetic material. Alternatively, the third blocking portion 175 may be formed in such a manner that the magnetic material is embedded between the inner surface and the outer surface of the third region 155. Alternatively, the third blocking portion 175 may include a ferrite sheet attached onto at least one of the inner surface and the outer surface of the third region 155.

Also, the second blocking portion 173 may be formed to include a magnetic material on at least one of an inner surface and an outer surface of the second region 153. Also, the first blocking portion 171 may be formed to include a magnetic material on at least one of an inner surface and an outer surface of the first region 151. Specifically, the first blocking portion 171 and the second blocking portion 173 may have the configurations described with reference FIGS. 13 and 14.

According to another exemplary embodiment, the magnetic field blocking unit 17 may include a second blocking portion 173 and a third blocking portion 175. In this case, the configuration of each of the second blocking portion 173 and the third blocking portion 175 is the same as described above.

In a case where the stylus pen 1 includes a magnetic field blocking unit 17 as described with reference to FIGS. 13 to 15, even when the user performs an approaching motion or a tilting motion, the inductance of the inductor unit 131 can be kept constant and the magnitude of the second electromagnetic signal can be maintained at a preset value. This will be described below with reference to FIGS. 16 and 17.

Figure 16:
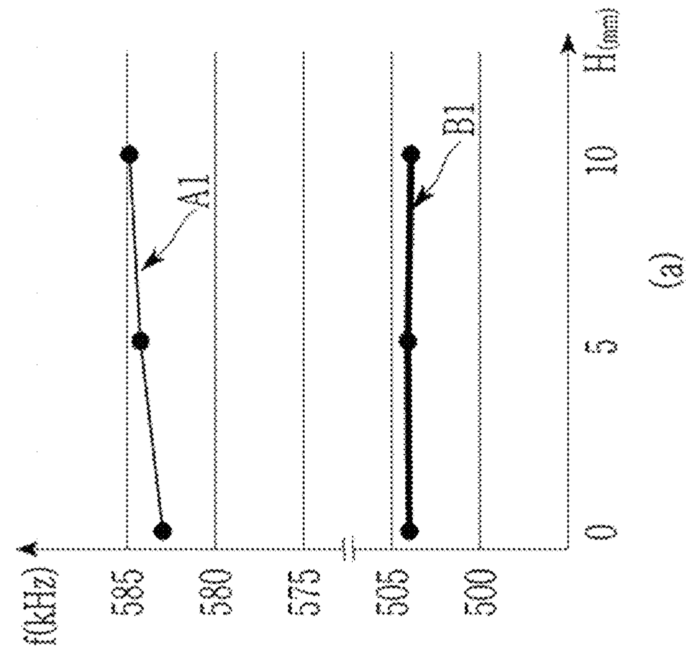
FIG. 16 is a diagram for explaining a change in resonance frequency depending on whether there is a magnetic field blocking unit according to an exemplary embodiment.

FIG. 16 is a diagram for explaining a change in resonance frequency depending on whether there is a magnetic field blocking unit according to an exemplary embodiment.

FIG. 16 (*a*) is a graph showing a change in resonance Frequency f when the user performs an approaching motion H, and FIG. 16 (*b*) is a graph showing a change in resonance frequency F when the user performs a tilting motion T.

Referring to FIG. 16(*a*), a first graph A1 shows a change in resonance frequency of a stylus pen that does not include the magnetic field blocking unit 17. A second graph B1 shows a change in resonance frequency of the stylus pen 1 including the magnetic field blocking unit 17 according to an exemplary embodiment. The first graph A1 shows that as the distance (height H) between the stylus pen and the touch screen 20 increases (to 5 mm or 10 mm), the resonance frequency changes (to about 583 kHz or about 585 kHz). In contrast, the second graph B1 shows that even though the distance (height H) between the stylus pen 1 and the touch screen 20 increases (to 5 mm or 10 mm), the resonance frequency hardly changes (constant at about 504 kHz).

Referring to FIG. 16(*b*), a first graph A2 shows a change in resonance frequency of a stylus pen that does not include the magnetic field blocking unit 17. A second graph B2 shows a change in resonance frequency of the stylus pen 1 including the magnetic field blocking unit 17 according to an exemplary embodiment. The first graph A2 shows that as the tilting angle T of the stylus pen changes (from 0 to 20° or 40°), the resonance frequency changes (from 584 kHz to about 583 kHz or 581 kHz). In contrast, the second graph B2 shows that as the tilting angle T of the stylus pen 1 changes (from 0 to 20° or 40°), the resonance frequency hardly changes (constant at about 504 kHz).

Figure 17:
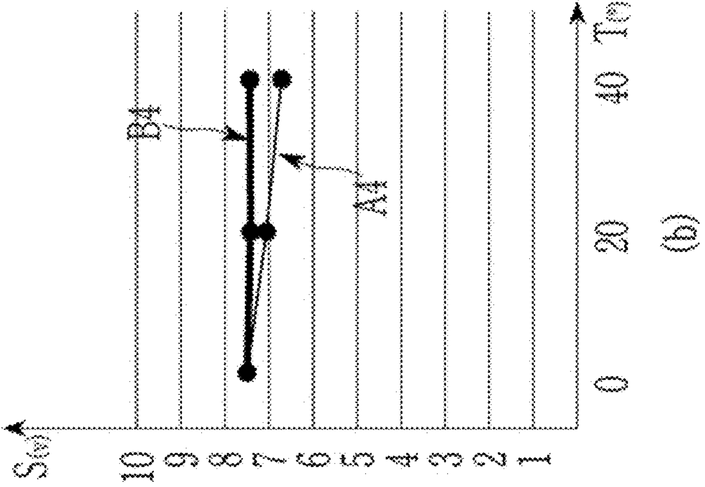
FIG. 17 is a diagram for explaining a change in magnitude of a pen signal depending on whether there is a magnetic field blocking unit according to an exemplary embodiment.
Figure 17:
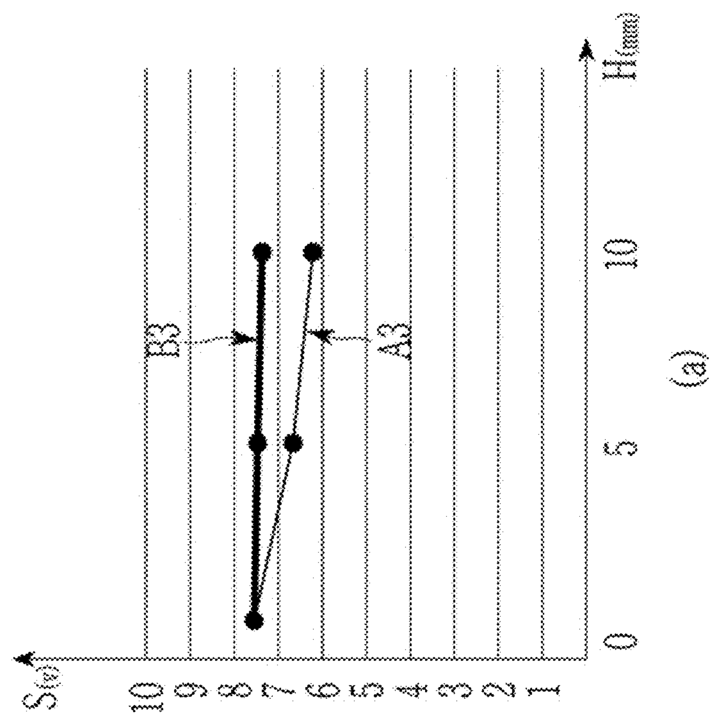

FIG. 17 is a diagram for explaining a change in magnitude of a pen signal depending on whether there is a magnetic field blocking unit according to an exemplary embodiment.

FIG. 17(*a*) is a graph showing a magnitude V of a second magnetic signal S when the user performs an approaching motion H, and FIG. 17(*b*) is a graph showing a magnitude V of a second magnetic signal S when the user performs a tilting motion T. In this case, the pen signal may correspond to a second electromagnetic signal generated by the stylus pen 1.

Referring to FIG. 17(*a*), a first graph A3 shows a magnitude V of a second magnetic signal S of a stylus pen that does not include the magnetic field blocking unit 17. A second graph B3 shows a magnitude V of a second magnetic signal S of the stylus pen 1 including the magnetic field blocking unit 17 according to an exemplary embodiment. The first graph A3 shows that as the distance (height H) between the stylus pen and the touch screen 20 increases (to 5 mm or 10 mm), the size of the second magnetic signal (S) changes (from 7.5 V to about 6.6 V or 6.2 V). In contrast, the second graph B3 shows that even though the distance (height H) between the stylus pen 1 and the touch screen 20 increases (to 5 mm or 10 mm), the magnitude of the second magnetic signal S remains constant (at about 7.5 V).

Referring to FIG. 17(*b*), a first graph A4 shows a magnitude V of a second magnetic signal S of a stylus pen that does not include the magnetic field blocking unit 17. A second graph B4 shows a magnitude V of a second magnetic signal S of the stylus pen 1 including the magnetic field blocking unit 17 according to an exemplary embodiment. The first graph A4 shows that as the tilting angle T of the stylus pen changes (from 0° to 20° or 40°), the magnitude of the second magnetic signal S changes (from 7.5 V to 7 V or 6.8 V). In contrast, the second graph B4 shows that even though the tilting angle T of the stylus pen 1 changes (from 0° to 20° or 40°), the magnitude of the second magnetic signal S remains constant (at about 7.5 V).

Although the exemplary embodiments of the present disclosure have been described in detail above, the scope of the present disclosure is not limited thereto, and various modifications and improvements made by those skilled in the art also fall within the scope of the present disclosure.

The invention claimed is:

1. A stylus pen, comprising:
a housing;
a tip at least partially exposed to the outside of the housing;
a resonance circuit unit accommodated in an internal space of the housing, including an inductor unit and a capacitor unit electrically connected to the inductor unit, and configured to resonate in response to a magnetic signal generated by a touch screen; and
a magnetic field blocking unit surrounding at least a partial portion of the resonance circuit unit, and including a magnetic material,
wherein the housing includes a first region surrounding the inductor unit and a second region surrounding the tip, and at least a partial portion of the inductor unit;
wherein the magnetic field blocking unit includes a first blocking portion where the magnetic material is coated on at least one of an inner surface and an outer surface of the first region, and a second blocking portion where the magnetic material is coated on at least one of an inner surface and an outer surface of the second region; and
wherein the inductor unit is adjacent the tip.

2. The stylus pen of claim 1,
wherein the housing further includes:
a third region surrounding the capacitor unit.

3. The stylus pen of claim 2, wherein
the magnetic field blocking unit further includes a third blocking portion where the magnetic material is coated on at least one of an inner surface and an outer surface of the third region.

4. The stylus pen of claim 2, wherein
the magnetic field blocking unit further includes a fourth blocking portion where the magnetic material is embedded between an inner surface and an outer surface of the first region.

5. The stylus pen of claim 2, wherein
the magnetic field blocking unit further includes a fifth blocking portion where the magnetic material is embedded between an inner surface and an outer surface of the second region.

6. The stylus pen of claim 2, wherein
the magnetic field blocking unit further includes a sixth blocking portion where the magnetic material is embedded between an inner surface and an outer surface of the third region.

7. The stylus pen of claim 2, wherein
the magnetic field blocking unit further includes a seventh blocking portion where the magnetic material is printed on at least one of an inner surface and an outer surface of the first region.

8. The stylus pen of claim 2, wherein
the magnetic field blocking unit further includes an eighth blocking portion where the magnetic material is printed on at least one of an inner surface and an outer surface of the second region.

9. The stylus pen of claim 2, wherein
the magnetic field blocking unit further includes a ninth blocking portion where the magnetic material is printed on at least one of an inner surface and an outer surface of the third region.

10. The stylus pen of claim 2, wherein
the magnetic field blocking unit further includes a tenth blocking portion where the magnetic material is applied on at least one of an inner surface and an outer surface of the first region.

11. The stylus pen of claim 2, wherein
the magnetic field blocking unit further includes an eleventh blocking portion where the magnetic material is applied on at least one of an inner surface and an outer surface of the second region.

12. The stylus pen of claim 2, wherein
the magnetic field blocking unit further includes a twelfth blocking portion where the magnetic material is applied on at least one of an inner surface and an outer surface of the third region.

13. A stylus pen, comprising:
a housing;
a tip at least partially exposed to the outside of the housing;
a resonance circuit unit accommodated in an internal space of the housing, including an inductor unit and a capacitor unit electrically connected to the inductor unit, and configured to resonate in response to a magnetic signal generated by a touch screen; and a magnetic field blocking unit surrounding at least a partial portion of the resonance circuit unit, and including a magnetic material, wherein the housing includes a first region surrounding the inductor unit and a second region surrounding the tip, and at least a partial portion of the inductor unit;

wherein the magnetic field blocking unit further includes a thirteenth blocking portion including a ferrite sheet attached onto at least one of an inner surface and an outer surface of the first region, and a fourteenth blocking portion including a ferrite sheet attached onto at least one of an inner surface and an outer surface of the second region; and wherein the inductor unit is adjacent the tip.

14. The stylus pen of claim 13, wherein the housing further includes:

a third region surrounding the capacitor unit.

15. The stylus pen of claim 14, wherein the magnetic field blocking unit further includes a fifteenth blocking portion including a ferrite sheet attached onto at least one of an inner surface and an outer surface of the third region.

* * * * *